US 8,667,213 B2
Mar. 4, 2014

(12) United States Patent
Rogers et al.

(10) Patent No.: US 8,667,213 B2
(45) Date of Patent: *Mar. 4, 2014

(54) FLASH MANAGEMENT TECHNIQUES

(75) Inventors: Andrew Rogers, Redmond, WA (US);
Sachin C. Patel, Redmond, WA (US);
Yadhu N. Gopalan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,268

(22) Filed: Sep. 14, 2012

(65) Prior Publication Data

US 2013/0013856 A1 Jan. 10, 2013

Related U.S. Application Data

(63) Continuation of application No. 11/473,754, filed on Jun. 23, 2006, now Pat. No. 8,307,148.

(51) Int. Cl.
*G06F 13/00* (2006.01)
*G06F 13/28* (2006.01)

(52) U.S. Cl.
USPC .................................. 711/103; 711/E12.008

(58) Field of Classification Search
None
See application file for complete search history.

(56) References Cited

U.S. PATENT DOCUMENTS

| 5,404,485 | A | | 4/1995 | Ban |
| 5,832,493 | A | * | 11/1998 | Marshall et al. ............... 707/697 |
| 5,912,848 | A | | 6/1999 | Bothwell |
| 6,275,436 | B1 | | 8/2001 | Tobita et al. |
| 6,879,528 | B2 | | 4/2005 | Takeuchi et al. |
| 6,901,499 | B2 | | 5/2005 | Aashein et al. |
| 6,938,116 | B2 | | 8/2005 | Kim et al. |
| 6,988,175 | B2 | | 1/2006 | Lasser |
| 6,996,008 | B2 | | 2/2006 | Conley et al. |
| 7,076,599 | B2 | | 7/2006 | Aasheim et al. |
| 7,516,267 | B2 | | 4/2009 | Coulson et al. |
| 8,307,148 | B2 | * | 11/2012 | Rogers et al. ................. 711/103 |
| 2003/0101327 | A1 | | 5/2003 | Beck |
| 2003/0189860 | A1 | | 10/2003 | Takeuchi et al. |
| 2004/0019761 | A1 | | 1/2004 | Fukuzumi |
| 2004/0210706 | A1 | | 10/2004 | In et al. |
| 2004/0210709 | A1 | | 10/2004 | Conley et al. |
| 2005/0138272 | A1 | | 6/2005 | Liang et al. |

(Continued)

OTHER PUBLICATIONS

Chang, Li-Pin, et al., "Efficient management for large-scale flash-memory storage systems with resource conservation", http://delivery.acm.org/10.1145/1120000/1111610/p381-chang.pdf?key1=1111610&key2=8181194411&coll=GUIDE&dl=GUIDE&CFID=69372595&CFTOKEN=43900063, Nov. 2005.

(Continued)

*Primary Examiner* — Edward Dudek, Jr.
(74) *Attorney, Agent, or Firm* — Aaron Chatterjee; Raghu Chinagudabha; Micky Minhas

(57) ABSTRACT

Various flash management techniques may be described. An apparatus may comprise a processor, a flash memory coupled to the processor, and a flash management module. The flash management module may be executed by the processor to receive a write request to write data to the flash memory, write a first control sector with a sequence number to the flash memory, and write the sequence number, an address for a logical sector, and data to at least one physical sector corresponding to the logical sector of the flash memory. Other embodiments are described and claimed.

18 Claims, 9 Drawing Sheets

(56) References Cited

U.S. PATENT DOCUMENTS

2005/0216653 A1* 9/2005 Aasheim et al. ............. 711/103
2005/0223158 A1   10/2005 See et al.
2007/0168698 A1*  7/2007 Coulson et al. .................. 714/5

OTHER PUBLICATIONS

Chiang, Mei-Ling, et al., "Managing flash memory in personal communication devices", http://ieeexplore.ieee.org/xpl/abs_free.jsp?arNumber=658381, 1997.

Kim, Haan-Joon, et al., "A new flash memory management for flash storage system", http://ieeexplore.ieee.org/search/srchabstract.jps?arnumber=812717&isnumber=17591&punumber=6591&k2dockey=812717©ieeecnfs&query=%28+managing+flash+memory%3Cin%3Eab+%29&pos=1, 1999.

Yim, Keun Soo, et al, "A flash compression layer for SmartMedia card systems", http://ieeexplore.ieee.org/search/srchabstract.jsp?arnumber=1277861&isnumber=28566&punumber=30&k2dockey=1277861@ieeejrns&query=%28+managing+flash+memory%3Ci, Feb. 2004.

\* cited by examiner

400

FLASH MANAGEMENT TECHNIQUES

CROSS REFERENCE TO RELATED APPLICATION

This application claims the benefit of, and priority to, previously filed U.S. patent application Ser. No. 11/473,754 entitled "Flash Management Techniques" filed on Jun. 23, 2006, the subject matter of which is hereby incorporated by reference in its entirety.

This application is related to U.S. patent application Ser. No. 11/474,234 titled "Flash Driver Support Techniques," and filed on Jun. 23, 2006, the entirety of which is hereby incorporated by reference.

BACKGROUND

Flash memory is becoming increasingly ubiquitous in various electronic devices, particularly consumer electronics. Flash memory is a form of non-volatile memory that can be electrically erased and reprogrammed by region or blocks. Flash memory is less expensive than other similar memory types (e.g., EEPROM), and therefore has become the dominant technology wherever a significant amount of non-volatile, solid-state storage is needed. Examples of applications include digital audio players, digital cameras, mobile phones, and universal serial bus (USB) flash drives, just to name a few. As a result of its increased use, newer generation flash parts are continuously being developed with greater amounts of memory and improved performance characteristics. Newer generation flash parts, however, may also include a new set of design constraints that may increase management and implementation complexity. Consequently, improved flash media management techniques may be needed to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments generally relate to memory management techniques for various types of computing memory. Some embodiments relate to memory management techniques for flash memory in particular. One embodiment, for example, comprises a novel flash management module implementing a flash driver architecture that will support new flash memory types, such as multi-level cell (MLC) flash memory, large-block NAND flash memory, and others. The flash management module will still support some or all of the features of current flash drivers, such as atomic sector writes and wear-leveling. It will also address performance issues and attempt to work efficiently with transaction-safe file systems and databases.

In one embodiment, for example, an apparatus may include a processor, a flash memory coupled to the processor, and a flash management module. The flash management module may be executed by the processor to receive a write request to write data to the flash memory. The flash management module may write a control sector with a sequence number to the flash memory. The flash management module may write the sequence number, an address for a logical sector, and the data to at least one physical sector corresponding to the logical sector of the flash memory. The control sector may be used to identify dirty physical sectors, as well as allow physical sectors to be written atomically. In this manner, the flash management module may uniformly integrate management operations for both existing flash memory parts and new flash memory parts. Other embodiments are described and claimed.

DETAILED DESCRIPTION

Various embodiments may be directed to improved techniques to manage flash memory. A flash media is divided up into units of erase blocks. Each block is subdivided further into pages or sectors. With flash memory a bit can only be programmed from the logical value of one (1) to the logical value of zero (0), and not the other way around. In order to set a bit from zero (0) to one (1), the entire block must be erased. The flash media is abstracted into a block driver, which accepts reads and writes in units of sectors, which typically equate to a page in flash memory. If the flash driver is designed to write a certain logical sector to a directly mapped physical location, then this would require the entire block to be erased every time which is computationally expensive. Therefore, repeated writes to the same logical sector are written to a different physical sector location every time, and the old physical sector location is marked as "dirty." A dirty sector in this context means it is no longer in use and can be reclaimed.

Various embodiments may use a new flash algorithm that, among other features, improves the way old physical sector are marked as dirty. Since the old sector cannot be physical marked with a bit as dirty, as this would violate the sequential page programming requirement of newer flash memory parts, the sector is implicitly marked as dirty though the use of sequence numbers. Before the new sector is written, it is preceded by a control sector which specifies a sequence number of the current transaction. Once this control sector is written, the sectors in the transaction are written. The sequence number is incremented on every transaction. For a particular logical sector, only the physical sector with the highest sequence number is valid. All other physical sectors referring to that logical sector are considered dirty and are available to be reclaimed.

Since there is a control sector describing the transaction, the flash driver can also extend a single write to support multiple sector writes in the same transaction. All of the sectors are part of the same transaction as described by the preceding control sector with a sequence number. This allows for all of those sectors to be written atomically, where either all of the sectors are committed or none of them are. This may be implemented by storing the list of physical sectors that are part of the request in the control sector and the checksum of the data for the last sector in the transaction. If an unexpected power-failure occurs, then the checksum of the last sector can be verified to determine whether the entire transaction was completed. If the entire compaction was not completed, then the transaction is rolled-back.

Figure 1:
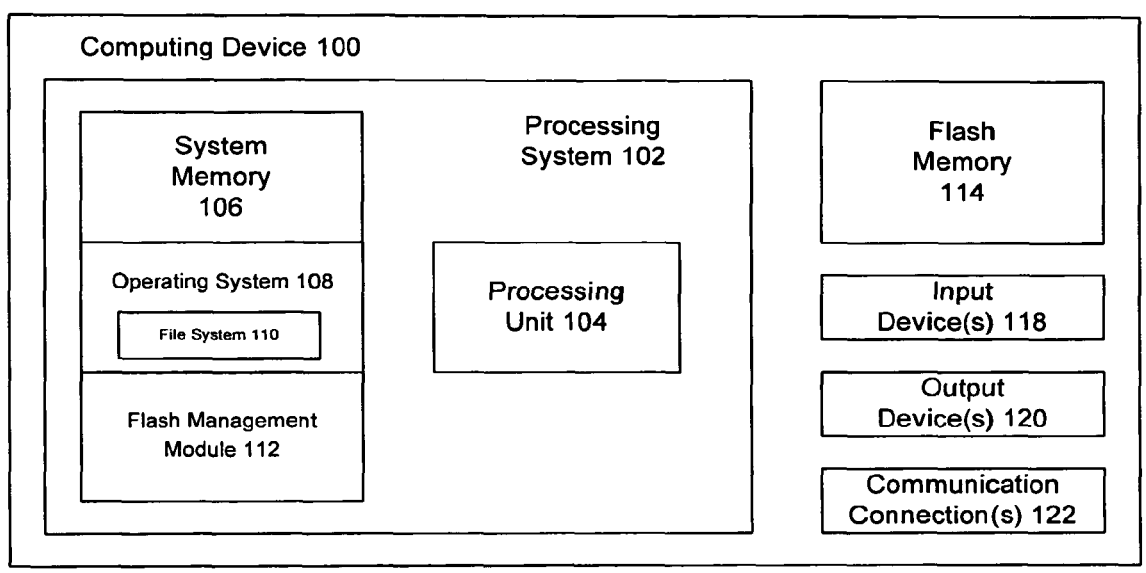
FIG. 1 illustrates an exemplary embodiment of a computing device.

FIG. 1 illustrates a block diagram for a computing device 100. Computing device 100 may represent a general system architecture suitable for implementing various embodiments. Computing device 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, software objects, or any combination thereof. Although computing device 100 as shown in FIG. 1 has a limited number of elements in a certain topology, it may be appreciated that computing device 100 may include more or less elements in alternate topologies as desired for a given implementation. The embodiments are not limited in this context.

In various embodiments, computing device 100 may be implemented as part of a target device. Examples of target devices may include, but are not limited to, a computer, a computer system, a computer sub-system, a workstation, a terminal, a server, a web server, a virtual server, a personal computer (PC), a desktop computer, a laptop computer, an ultra-laptop computer, a portable computer, a handheld computer, a personal digital assistant (PDA), a mobile computing device, a cellular telephone, a media device (e.g., audio device, video device, text device, and so forth), and any other electronic, electromechanical, or electrical device. The embodiments are not limited in this context.

In various embodiments, computing device 100 typically includes a processing system of some form. In its most basic configuration, computing device 100 may include a processing system 102 having at least one processing unit 104 and system memory 106. Processing unit 104 may be any type of processor capable of executing software, such as a general-purpose processor, a dedicated processor, a media processor, a controller, a microcontroller, an embedded processor, a digital signal processor (DSP), and so forth. System memory 106 may be implemented using any machine-readable or computer-readable media capable of storing data, including both volatile and non-volatile memory. For example, system memory 106 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 1, system memory 106 may store various software programs, such as one or more operating systems 108 and accompanying data. An operating system (OS) is a software program that manages the hardware and software resources of a computer. The OS performs basic tasks, such as controlling and allocating memory, prioritizing the processing of instructions, controlling input and output devices, facilitating networking, managing files, and so forth. Examples of OS 108 may include MICROSOFT® WINDOWS®, as well as others.

OS 108 may further comprise a file system 110. File system 110 may store and organize computer files to facilitate the location, access and use of the files. File system 110 may store and maintain the files with some form of computer-readable media or machine-readable media, as previously described. More formally, file system 110 may represent a set of abstract data types that are implemented for the storage, hierarchical organization, manipulation, navigation, access, and retrieval of data. OS 108 and file system 110 may be integrated, or alternatively, may be implemented as separate software programs.

Computing device 100 may also have additional features and/or functionality beyond processing system 102. For example, computing device 100 may have one or more flash memory units 114. In another example, computing device 100 may also have one or more input devices 118 such as a keyboard, mouse, pen, voice input device, touch input device, and so forth. In yet another example, computing device 100 may further have one or more output devices 120, such as a display (e.g., display 110), speakers, printer, and so forth. In still another example, computing device 100 may also include one or more communications connections 122. It may be appreciated that other features and/or functionality may be included in computing device 100 as desired for a given implementation.

In various embodiments, computing device 100 may further include one or more communications connections 122 that allow computing device 100 to communicate with other devices. Communications connections 122 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In various embodiments, computing device 100 may further include one or more flash memory units 114. Flash memory unit 114 may comprise any form of non-volatile memory that can be electrically erased and reprogrammed by region or blocks. Flash memory unit 114 may be implemented as either removable or non-removable memory. Examples of flash memory unit 114 may include NAND flash memory, NOR flash memory, MLC flash memory, large block NAND flash memory, and others. The embodiments are not limited in this context.

Presently, there are two major types of flash memory used in the market. The first type of flash memory is referred to as NAND flash memory. NAND flash memory comprises media divided into a collection of blocks which are then further subdivided into pages, anywhere from the traditional 512 bytes in size to 2 kilobytes (KB) in size for certain large-block NAND, for example. NAND flash memory is typically split into a series of contiguous blocks (e.g., 1-N). Each block is then further subdivided into some number of pages (e.g., 32 sectors per block is a common value for a 16 MB NAND flash device). Each page is then further divided into two distinct sections. The first section is a data area used to store information. The data area may be anywhere from 512 bytes on small block NAND and 2 KB on large block NAND, for example. The second section is a spare area used to store supplemental or extraneous information. The spare area may be anywhere from 16 bytes on small block NAND and 64 bytes on large block NAND, for example. Examples of extraneous information may include flash abstraction layer (FAL) metadata, error-correction codes (ECC) to safeguard against data corruption due to leakage currents, and so forth.

The second type of flash memory is referred to as NOR flash memory. NOR flash memory comprises media divided into a collection of blocks and all bytes are individually addressable. NOR flash memory is typically split into a series of contiguous blocks (e.g., 1-N). Similar to conventional read-only memory (RAM), every byte in these blocks is individually addressable.

In general, NAND flash memory and NOR flash memory have corresponding advantages and disadvantages. For example, NAND flash is typically characterized by slower READ performance than NOR flash memory but faster WRITE performance than NOR flash memory. NOR flash memories typically have READ speeds comparable to RAM and allow for Execution-In-Place (XIP) of system code. In another example, NAND flash memory typically ships with bad blocks on the media which cannot be used for storing data. As a result, the system software (e.g., device driver) is responsible for bad block management. NAND FLASH is also notorious for leakage currents in the oxide layer (Tox) of the floating gate. Practically, this means that it is possible for bits in a page to randomly change value over time. As a result, it is necessary to use ECC techniques to detect and correct bit changes in the media. In still another example, NOR flash memory typically has a much slower erase time than NAND flash memory. In a final example, NAND flash memory density scales better due to the underlying transistor structure.

In an effort to take advantage of the various performance characteristics of NAND flash memory, various new types of NAND flash memory parts have been recently developed. For example, MLC flash memory stores 2 bits per cell, as opposed to 1 bit per cell with regular single-level cell (SLC) NAND flash. This allows greater density of storage, but it also has several drawbacks. It affects the reliability of the part, which requires using a larger ECC to detect and correct bit changes. It also restricts the way in which the part is programmed. In another example, large block NAND basically has a larger page size (e.g., the typical value is currently 2 KB), which gives it a larger block size as well. The larger page size also means that the spare area is larger too (e.g., 64 bytes for a 2 KB data page). This part also has drawbacks compared to small block SLC parts.

Although MLC and large block NAND have several advantages over conventional NAND flash memory parts, MLC and large block NAND flash memories also introduce new design constraints regarding how the flash memory is programmed. For example, both MLC flash memory and large block NAND flash memory require pages to be programmed sequentially within a block. Once a page has been written and subsequent pages have been written, that original page cannot be re-written before the entire block is erased. MLC flash memory imposes the additional restriction of limiting only one partial page program. This means that once a page has been written, it can no longer be written again without being erased. Large block NAND has a current limitation of 8 partial page programs, with 4 for the main data area and 4 for the spare area, although this may change in other implementations.

In addition to the specific design constraints imposed by MLC and large block NAND flash memory devices, both NAND and NOR flash memory suffer from a number of general design constraints. For example, flash memory write operations can only set a bit from a logical one (1) to a logical zero (0). In another example, erasing a block sets all of the bits in the block to a logical one (1). In yet another example, only blocks can be erased. It is not possible to erase individual pages/bytes in a block without erasing all pages/bytes within the same block. In still another example, blocks have a limited erase lifetime (e.g., 100,000 to 1,000,000 cycles). In yet another example, read operations do not count against the write/erase lifetime. As a result of these characteristics, it is necessary to perform "wear-leveling" on the flash memory to maximize the lifetime of the device. Additionally, a technique for effectively erasing blocks without losing data needs to be used. Thirdly, considering that the target for flash memory is often battery-powered devices it is necessary to safeguard against data loss during power-failure situations. Lastly, NAND flash memory requires the use of ECC techniques to safeguard against data corruption due to leakage currents.

In order to manage the different types of flash memory 114 and corresponding design constraints that may be implemented for computing device 100, computing device 100 may include a flash management module (FMM) 112. FMM 112 may be used to implement a robust flash driver architecture designed to manage flash memory, such as flash memory 114. FMM 112 may be arranged to manage flash memory 114 when implemented using any type of flash memory, including various types of NAND flash memory and/or NOR flash memory. Furthermore, FMM 112 may be arranged to manage flash memory 114 when implemented using various improved forms of NAND flash memory as well, such as MLC flash memory, large block NAND flash memory, and so forth.

FMM 112 may provide various advantages over conventional flash management techniques. For example, FMM 112 may be arranged to support both newer generation flash parts and legacy flash parts, such as MLC flash memory types and large-block NAND flash memory types, in addition to normal SLC NAND flash and NOR flash. FMM 112 is also flexible enough to handle changes in flash capacity. Further, FMM 112 is backwards compatible with current file systems, and supports wear-leveling to maximize the lifetime of a given flash device. FMM 112 also supports data integrity during power-failure situations. FMM 112 further supports writes that will allow multiple discontinuous runs of sectors to be committed in an atomic manner. This can be used, for example, by transaction-safe file systems to improve performance by eliminating redundant copying. An example of a transaction-safe file system may include a transaction-safe of the file allocation table (TFAT). This atomic-discontiguous-sector-write feature also enables file systems that are not traditionally transaction safe, like normal FAT, to become transaction safe assuming the file system implementation takes advantage of the new feature. FMM 112 also implements an enhancement to the interface between a flash abstraction layer (FAL) and flash media driver (FMD) so that it is more flexible and can take advantage of special features on the flash device. FMM 112 may also implement other techniques, such as supporting multiple instances of stores with a single driver, reducing boot time, and reducing the amount of RAM that is required after FMM 112 has been initialized. Computing device 100 in general, and FMM 112 in particular, may be described in more detail with reference to FIG. 2.

Figure 2:
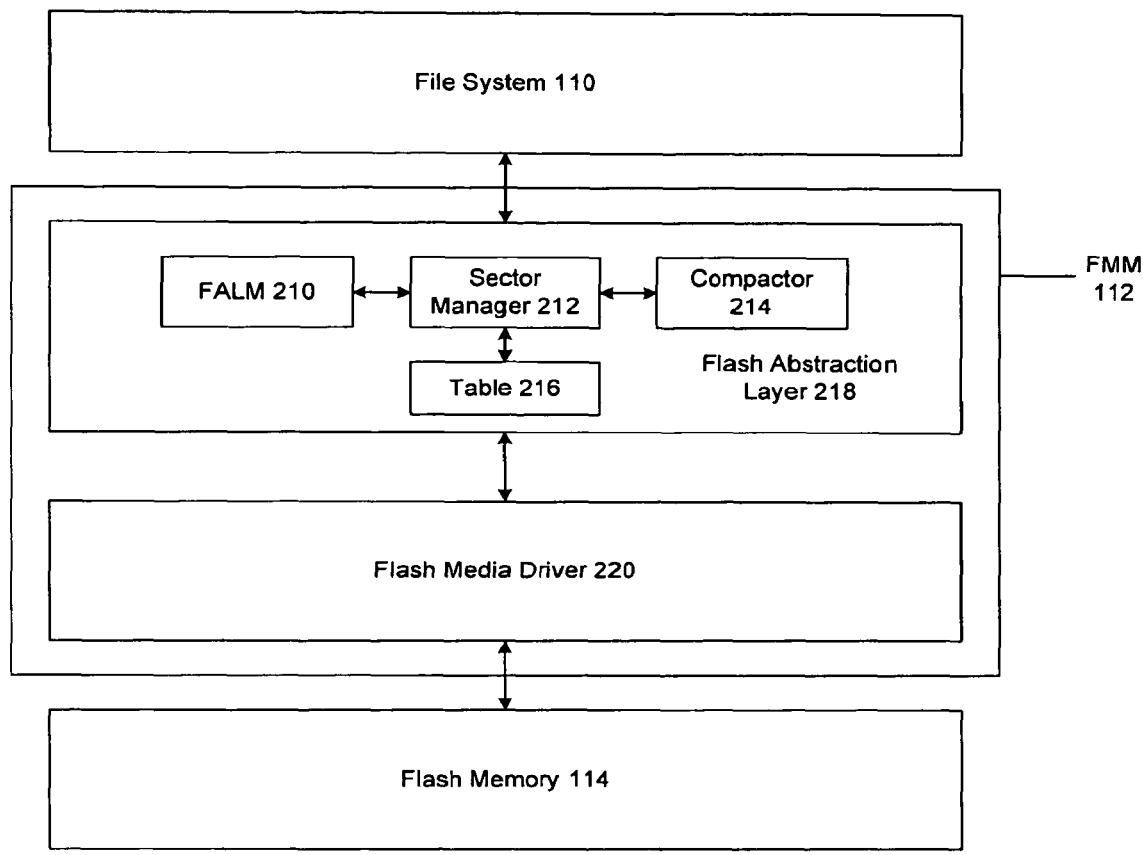
FIG. 2 illustrates an exemplary embodiment of a flash management module.

FIG. 2 illustrates an exemplary embodiment of FMM 112. FIG. 2 illustrates a high-level architecture for FMM 112. As shown in FIG. 2, file system 110 is positioned above a translation layer referred to as FAL 218. FAL 218 is responsible for handling all input/output (I/O) requests from the upper-level file system 110, implementing all of the necessary wear-leveling operations, maintaining data integrity, handling power-failure situations, and so forth. FAL 218 typically passes the actual read and write requests onto FMD 220. FMD 220 may be implemented as a set of entry points that are responsible for interacting with the actual flash hardware, such as flash memory 114, for example. FMD 220 is responsible for implementing the program/erase algorithms necessary to perform read operations, write operations, and erase operations using flash memory 114.

The high-level architecture shown in FIG. 2 provides implementation flexibility. For example, through the use of FAL 218, different types of file system 110 may be implemented for a given target device. Additionally, through the use of FMD 220, different types of flash memory 114 may be implemented for a particular target device. Furthermore, different types of ECC codecs (if any) may be selected to use for a respective memory device since the ECC codec has been relegated to FMD layer in the abstraction chain.

In various embodiments, FAL 218 may be separated into several functional components or modules. In one embodiment, for example, FAL 218 may include a main flash abstraction layer module (FALM) 210, a sector manager 212, a compactor module 214, and a mapping table 216. FALM 210 is a software object responsible for handling the read/write to a particular flash region of flash memory 114, as well as building up the logical-to-physical mapping during initialization. A software object may represent any discrete unit of software arranged to perform a specific function. Sector manager 212 is responsible for managing the list of free and dirty sectors on the media. When prompted, sector manager 212 will return the next free sector on the media if available. Mapping table 216 is responsible for maintaining the logical-to-physical sector mapping. File system 110 uses logical sectors that are then mapped to arbitrary physical sectors on the media. As a result, FAL 218 must translate all logical sector addresses from file system 110 into the corresponding physical sector addresses on the media. Compactor module 214 is responsible for recycling dirty sectors into free sectors. Compactor module 214 analyzes an entire flash block to determine which sectors are dirty and can be recycled. Any sectors in a block that are not dirty are re-mapped to another portion of the media.

FALM 210 operates as the main control point of FAL 218. It manages a particular flash region and handles the following main functions (among others): (1) ReadFromMedia; (2) WriteToMedia; (3) DeleteSectors; and (4) BuildupMappingInfo. FAL 218 in general, and FALM 210 in particular, implements the concept of sequence numbers to mark a particular transaction. Sequence numbers may be described later in more detail with reference to FIG. 9. For example, sequence numbers may be used to track a write transaction. The write transaction will begin with a control sector, which contains the sequence number as well as the list of physical sectors that will be written. Followed by the write control sector, the sectors that were passed in will be written sequentially. Once the transaction is completed, any logical sectors with the same logical sector address and an older sequence number will be interpreted as dirty.

FALM 210 may be implemented using any number of data structures. In one embodiment, for example, FALM 210 may use a data structure having a FAL state header. The state of FALM 210 will be persisted starting with the first block of the flash region. It will contain all of the necessary information to prevent having to scan the entire flash memory 114 during a safe shut down. The FAL state header may contain various types of information, as follows:

Signature (DWORD)—This is the identifier for the type of control sector.

End sector (DWORD)—This is the last physical sector number that makes up the FAL state. It contains a flag indicating whether the state is valid, i.e. a safe shutdown.

Control Sequence Number (LARGE_INTEGER)—This is the next sequence number to assign to a control sector.

Data Sequence Number (DWORD)—This is the next sequence number to assign to a data sector.

Checksum (DWORD)—This is the checksum of the entire FAL state, excluding the end sector.

Serialized free list offset (DWORD)—This is the offset from the beginning of the header for the serialized free list object. The free list object contains the set of runs describing the free blocks, as well as the current pointer for the next free sector for both control and data.

Serialized free list length (DWORD)—This is the length in bytes of the serialized free list object.

Serialized dirty list offset (DWORD)—This is the offset from the beginning of the header for the serialized dirty count list object. The dirty list object contains the number of dirty sector in each block.

Serialized dirty list length (DWORD)—This is the length in bytes of the serialized dirty list object.

Serialized mapping table offset (DWORD)—This is the offset from the beginning of the header for the serialized master mapping table. The master mapping table contains the physical sector locations for all of the secondary mapping tables.

Serialized mapping table length (DWORD)—This is the length in bytes of the serialized master mapping table.

The write control sector (data portion) will have the following format:

Signature (DWORD)—This is the identifier for the type of control sector. This will allow for extensibility in defining new control sectors.

Number of control sectors (DWORD)—Since the physical sector run list can potentially take multiple sectors, a write control can take up a series of sectors. These sectors must be physically contiguous. Each sector in the series will have the same format.

Next free physical control block (DWORD)—This will be the next physical block that will be allocated as a control block. This is needed to handle a partial write of a control sector (described later)

Checksum for last sector (DWORD)—This will be a checksum for the last sector of the transaction. This is used to determine if the transaction fully completed successfully.

Checksum for control sector (DWORD)—There will be a checksum for the control sector data itself to determine if there was a partial write of the control sector.

Sequence number for control sector (LARGE_INTEGER)—The sequence number for the control sector will be 64 bits, which is assumed to be large enough such that rollover does not need to be handled.

Physical sector list count (DWORD)—This is the number of bytes in the physical sector list Physical sector runs (array of DWORD pairs)—This will be a list of runs, each run consisting of a start physical sector and the number of physical sectors in the run.

The SectorInfo will be stored in the spare area of the page. The SectorInfo may contain various types of sector information, such as a logical sector address, a sequence number, original equipment manufacturer (OEM) reserved bits, and FAL control bits. The FAL control bits may include a bit identifying a control sector and a bit identifying a sector as a normal data sector. The bad block marker and the ECC will be managed by FALM 210.

In various embodiments, sector manager 212 is responsible for managing sectors of flash memory 114, including a free list, dirty list, and sequence numbers. It implements the following major functions for access to the free list: (1) GetFreeDataSectors; and (2) GetFreeControlSectors. It implements the following major functions for access to the dirty list: (1) MarkSectorsAsDirty; and (2) UnmarkSectorsAsDirty. It implements the following major functions for access to the sequence numbers: (1) GetNextDataSequenceNumber; (2) GetNextControlSequenceNumber; and (3) HandleSequenceNumberRollover.

The free list may be structured so that it may be managed on a block level granularity. The list may comprise a list of runs, with each run specifying a start block and number of blocks. The node structure may comprise the following fields: (1) starting block; (2) number of blocks; and (3) pointer to next node. The list structure may comprise the following fields: (1) a head node; (2) a tail node; (3) next free data sector; (4) next free control sector; and (5) number of free blocks.

The dirty list may comprise a fixed size array containing the number of dirty sectors within each block. Each entry for the dirty list will either be 8 bits or 16 bits, depending on the minimum number of bits needed to represent the highest number of sectors per block. The dirty list may comprise the following fields: (1) a dirty list array; and (2) a size of each entry.

The GetFreeDataSectors object will take in the number of free sectors requested and a flag indicating whether the request is critical. First, the free sectors will be allocated from the current free data block that has been removed from the main free block list. Once that is used up, then one or more blocks will be removed from the main free block list via the GetNextFreeBlock object. A final list of sector runs will be returned to the caller.

There will be a critical threshold set at 4 blocks by default, 2 blocks for control sectors and 2 blocks for data sectors. If the number of free blocks after fulfilling the request is less than or equal to the critical threshold, then the sector manager will start compaction via the Compactor::StartCompactor object and pass in the minimum number of free sectors needed. Further requests by the compactor for free sectors will be done by passing the critical request flag to GetFreeDataSectors/GetFreeControlSectors, indicating that compacting operations should be skipped and the free block count can temporarily drop below the critical threshold in order to complete the request.

The GetFreeControlSectors object is very similar to the GetFreeDataSectors object, except that it maintains its own current free control block that it allocates from. It will also use the GetNextFreeBlock function to retrieve the next free block once it has used up the current block. The GetFreeControlSectors object also has an additional flag to indicate that the sectors need to start on a new block. In this case, the current free control block is discarding and a new block is allocated. Also, the GetFreeControlSectors object guarantees that the required number of control sectors are physically contiguous, so it can potentially skip one or more ending sectors in order to ensure this.

The MarkSectorsAsDirty object and the UnmarkSectorsAsDirty object will adjust the count of the dirty sectors in each block. The dirty list is an array, where each entry represents the number of dirty sectors in the block. These functions will take in a starting physical sector and number of physical sectors to mark dirty. These functions will figure out which block they correspond to and increment (e.g., in mark) or decrement (e.g., in unmark) the count. The function will assume that the sectors are all within one block. This can be changed, however, if desired.

Sector manager 212 will manage both the data and control sequence number. It will use the SequenceNumber:Increment function to increment the sequence number. If the data sequence number follows over, then Increment will return a special LRESULT and the HandleSequenceNumberRollover object will be called. There will be a flag to disable handling rollover, which will be used on initialization during a BuildupMappingInfo object call.

When a sequence number hits its maximum value, it will begin to count in the opposite direction. On any transition, however, there cannot be any sectors already in that direction. For example, the sequence number will start by counting up until they hit a certain maximum, then begin to count down. Once the number hits a minimum, it will start counting up again. Before starting to count up, however, there cannot be any data sectors on flash memory 114 that contain any sectors counting up. Therefore, every SectorInfo will need to be scanned. Any data sector found to have a sector counting up will have to be compacted. This may be described in more detail with reference to FIG. 9.

When compacting the block, all sectors that are mapped will be assigned a new sequence number. This sequence number, however, still needs to be counting in the down direction. Therefore, there will be a buffer on each end of the number space for these transition sequence numbers. The SequenceNumber object will continue to count in its present direction. Once all of the affected sectors have been compacted, the SequenceNumber::Reverse object will explicitly be called to reverse the direction of the counting.

On a safe shutdown, FALM 210 will first call the SectorMgr::Serialize object, which will return the free and dirty list as a byte stream. Then, FALM 210 will call SectorMgr::Deinit, which will clean up all of the internal data structures.

As previously mentioned, FALM 210 is a software object responsible for handling the read/write to a particular flash region of flash memory 114. For read operations, a physical sector is queried using an object such as MappingTable::GetPhysicalSectorAddr for each logical sector in the read request. The physical sector is then read from FMD 220. This can potentially be optimized by trying to read physical sectors in runs if they are consecutive, assuming there are hardware optimizations for this technique. FALM 210 may implement write operations in a number of different ways, some of which are described in FIGS. 3-7 as follows.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
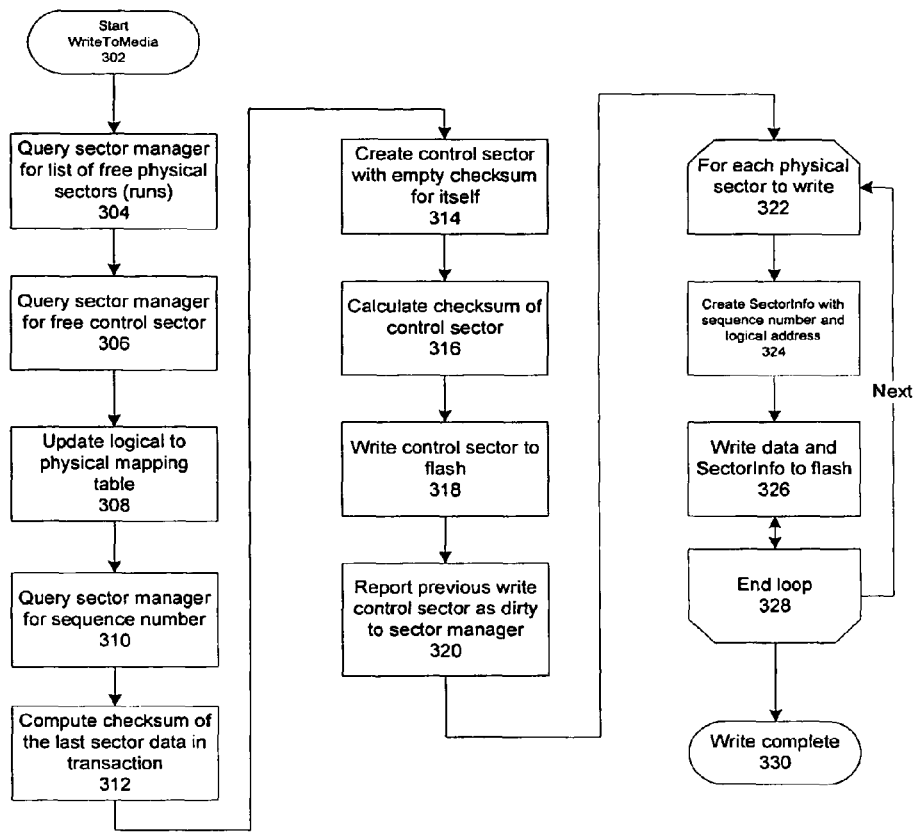
FIG. 3 illustrates an exemplary embodiment of a first logic flow.

FIG. 3 illustrates one embodiment of a logic flow 300. Logic flow 300 may be representative of the operations executed by one or more embodiments described herein, such as computing device 100 and/or FMM 112, for example. Logic flow 300 illustrates write operations to flash memory 114. A write request may be received by FAL 218 from file system 110. Write operations may be initiated using a WriteToMedia object at block 302.

To begin write operations in response to a write request or write transaction, sector manager 212 may be queried for a list of free physical sectors or sector runs at block 304. An object such as SectorMgr::GetFreeDataSectors may be used to get a list of free physical sector runs necessary to fulfill the write request. Sector manager 212 will be responsible for calling compactor module 214 if necessary to free up necessary sectors.

Sector manager 212 may be queried for a free control sector at block 306. The number of control sectors required to represent this request will first be determined. This is based on the size of the physical run list. Then, an object such as SectorMgr::GetFreeControlSectors will be called to get the free control sectors. This will also return the next free block for the control block, since this is needed as part of the control sector for recovery purposes. Sector manager 212 will guarantee that the control sectors are physically contiguous.

Sector manager 212 may update logical-to-physical mapping table 216 at block 308. Sector manager 212 may loop through each of the physical sectors returned and update the logical-to-physical mapping with an object such as MappingTable::MapLogicalSector. This can potentially require a page out of one or more mapping tables to flash before the write can begin. An object such as MapLogicalSector sector will return an existing physical sector if one exists. In this case, a sector may be reported as dirty to sector manager 212 via an object such as SectorMgr::MarkSectorAsDirty.

Sector manager 212 may be queried for a sequence number at block 310. Objects such as SectorMgr::GetNextDataSequenceNumber and SectorMgr::GetNextControlSequenceNumber may be used to get the next sequence number. An object such as GetNextDataSequenceNumber can potentially cause a sequence number rollover, which will be handled by that function.

A checksum of the last sector data in the write transaction may be computed at block 312. The checksum library can potentially be a pluggable component that would be called to calculate the checksum of the last sector data in the write transaction. The checksum may be used for power-failure recovery operations.

At this point the control sectors may actually be created and written to flash memory 114. One or more control sectors may be created with empty checksums for each control sector at block 314. The control sectors containing the physical run list and all of the other required information may be created at this stage of operations. A checksum for each control sector may be computed at block 316. An individual checksum for each control sector that is part of the series may be computed at block 316, and the values will be added in the control sector field. The control sectors may be written to flash memory 114 at block 318. The control sectors may be written to flash through FMD 220. If a write failure occurs on any of the sectors, one or more new physical sectors will be queried from sector manager 212 that is located on a new physical block. The sectors will be written to the new location and the old control block that failed will be erased, as all old control sectors are considered dirty. Previous write control sector may then be reported as dirty to sector manager 212 at block 320. A call may be made to an object such as SectorMgr::MarkSectorsAsDirty to indicate the old control sectors are no longer needed.

Once the control sectors have been created and written to flash memory 114, write operations may begin to write the data for a write request to flash memory 114. As indicated at block 322, for each physical sector to be written the following operations at block 324, 326, and 328 may be performed. At block 324, a data structure SectorInfo may be created having sector information such as a sequence number and logical address. At block 326, data and SectorInfo may be written to flash memory 114 through FMD 220. If a write failure occurs in any of the sector writes, then all blocks that contain those sectors will be compacted to a new physical block and the write call will fail. The write is complete at block 330. The compaction process is described later with reference to FIG. 5.

A delete sectors operation indicates to FAL 218 that a particular set of logical sectors are no longer in use by file system 110, and therefore can be treated as dirty for reclamation. A delete sectors operation may be called to update the in-RAM state of dirty sectors by calling an object such as SectorMgr::MarkSectorsAsDirty and unmapping them from the logical-to-physical mapping table with an object such as MappingTable::MapLogicalSector.

In general, mapping table 216 will be persisted on a safe shutdown. During a power failure, however, the delete information can potentially become lost if mapping table 216 is not flushed properly. In some cases this may be acceptable because the delete sectors are an optimization for FAL 218. Also, file system 110 can potentially provide FAL 218 with the state of deleted sectors on mount. The delete sectors I/O control (IOCTL) can be extended to provide runs of delete sectors, so that multiple calls do not have to be made.

To determine whether a persisted mapping table 216 is valid, an object such as LoadMappingInfo may be called during initialization. The LoadMappingInfo object may check a signature for the FAL state header. If the signature of the FAL state header is invalid, then mapping table 216 is considered invalid and mapping table 216 needs to be built up manually using an object such as BuildupMappingInfo. The LoadMappingInfo object may also check an end sector for an invalid flag. The FAL state header contains the physical sector location of the end sector. This sector may be read to determine whether mapping table 216 has been invalidated. Mapping table 216 gets invalidated after the first write and gets cleared once a new mapping table has finished being written during a safe shutdown. The LoadMappingInfo object may also generate a checksum of the persistent FAL state information. The entire FAL state may be loaded into memory and a checksum for the data may be performed in order to ensure it is valid. If it is invalid, then the BuildupMappingInfo object needs to be called. Once the persisted state of the FAL has been validated, the free list, dirty list, and mapping table 216 can be deserialized into the appropriate objects directly from the in-RAM buffer of the FAL state.

The BuildupMappingInfo object may be called to build up the logical-to-physical mapping information in a non-safe shutdown case. In this case, two manual passes may be performed, where every sector is scanned. Among the goals of the first pass is to locate all of the secondary mapping tables, determine any valid secondary mapping tables, and determine all of the free blocks and the current pointer for the next free control and data sector. The first pass will loop through each block on flash memory 114. Any bad or reserved blocks (using FMD_GetBlockStatus) will be skipped. Then, each of the sectors within the block will be scanned and the SectorInfo will be read.

There are three cases that need to be handled in a non-safe shutdown case, referred to as a control sector case, a mapped sector case, and a free sector case. The first case is a control sector case. If the control sector bit is set, then first validate the checksum to ensure the control sector is valid. If it is valid, then compare this to the highest sequence number seen, and if it is the highest, then save off the physical sector location of this sector for later processing. The second case is a mapped sector. If the physical sector is mapped to a logical sector, then there are two cases to handle, a data sector and a mapping table sector. If the sector is a mapping table sector, which is determined by having a logical sector number that extends past the actual logical sector range, then report the secondary mapping table to the master mapping table with the object MappingTable::AddMasterTableEntry. This will determine if this is the highest sequence number seen for a particular entry, and if so, record the physical sector location. It will also verify that there are not any data sectors with a higher sequence number that invalidate. If this is a data sector, then this may be reported to the master table with MappingTable::CheckMasterTableEntry. This will invalidate any corresponding secondary mapping table with a lower sequence number, as well as record the sequence number if it is the highest seen. The third case is a free sector case. If this is a free sector, then add it to the free list. If the sector is the first one in the block, then the whole block can be added to the free list because the sectors within a block are allocated sequentially.

After an initial pass is done, the highest control sector will be evaluated to make sure the last operation completed successfully and whether any recovery steps need to be taken. Recovery operations may be described in more detail with reference to FIG. 4.

Figure 4:
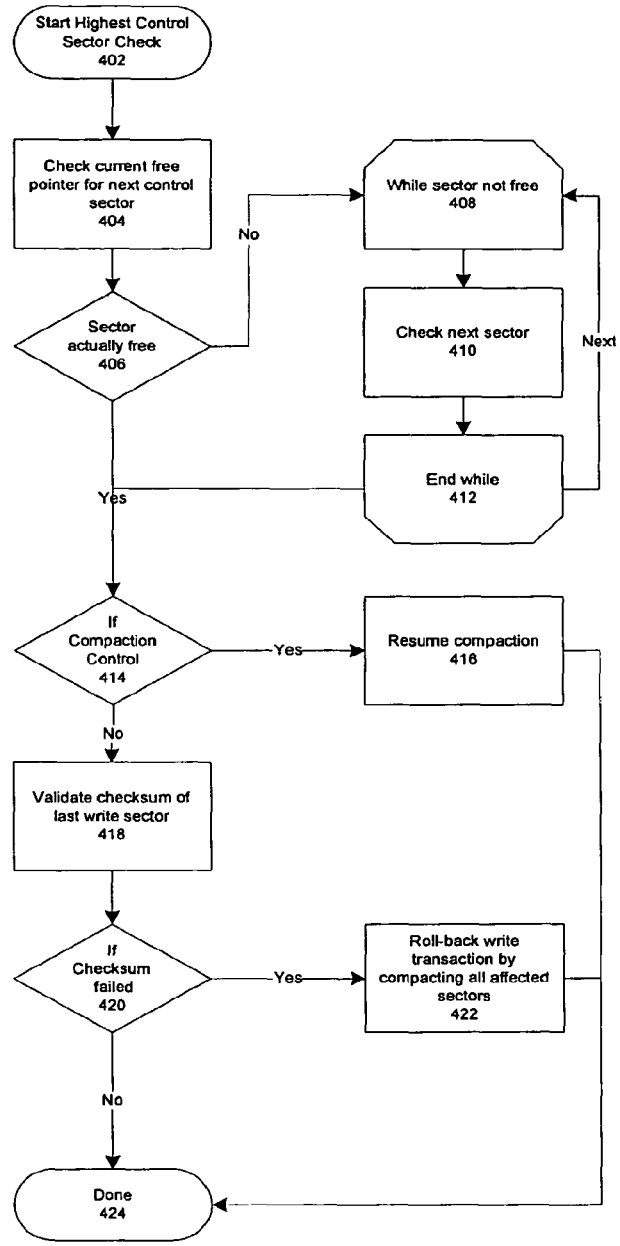
FIG. 4 illustrates an exemplary embodiment of a second logic flow.

FIG. 4 illustrates an exemplary embodiment of a logic flow 400. Logic flow 400 may illustrate a set of operations to evaluate a highest control sector to initiate recovery operations as indicated at block 402. A current free pointer for a next control sector is checked at block 404. A determination as to whether the sector is actually free is made at diamond 406. Once the first pass is complete, the location of the highest control sector is recorded. If the highest control sector is not the last sector in the block, then the next free control sector is immediately next. Otherwise, the highest control sector has a pointer to the next free block. The next free sector needs to be checked to make sure there was not a torn write. This is verified by making sure the entire data and spare area are set to a predetermined value, such as 0xff, for example. If the sector is in fact not free at diamond 406, then while the sector is not free at block 408 the next sector is examined at block 410 until an actual free sector is found at block 412. This is then recorded as the next control sector free pointer.

A determination as to whether the sector is a compaction control sector at diamond 414. If the sector is a compaction control sector at diamond 414, then the compaction operation will be resumed with the Compactor::ResumeCompaction function at block 416, and the routine exits at block 424. If the sector is not a compaction control sector at diamond 414, then a checksum of the last write sector may be validated at block 418. If the checksum of the last write sector fails at diamond 420, then all of the data sectors in the transaction need to be deleted so that the write transaction is rolled back at block 422. This is done by compaction all of the blocks containing the data sectors with the Compactor:: CompactBlocks function. The same process is done for a failed checksum of a mapping table to be consistent. If the checksum of the last write sector does not fail at diamond 418, the routine exits at block 424.

Once the first pass and highest control sector evaluation operations are performed, the BuildupMappingInfo object may perform a second pass. Among the goals of the second pass is to determine the mapping table for all of the secondary mapping tables that are invalid, and determine the dirty count for each block. The second pass will loop through each block on flash memory 114. Any bad or reserved blocks (using the object FMD_GetBlockStatus) will be skipped. Then, each of the sectors within the block will be scanned and the SectorInfo will be read. As with the first pass, there are three cases to be handled by the second pass, similarly referred to as control sector case, mapped sector case, and free sector case. In the control sector case, if the control sector bit is set, then the dirty count for this block can be incremented via the object SectorMgr::MarkSectorsAsDirty, unless this is the highest control sector, in which case it is not marked as dirty because it is still needed. In the mapped sector case, if this physical sector is mapped to a logical sector, then there are two cases to handle, a data sector and a mapping table sector. If the sector is a mapping table sector, then a check may be made as to whether this is the highest version via the MappingTable::GetPhysicalSectorAddr object. If this is an older version where the physical sector does not match what is returned, then this sector is marked as dirty. If this is a data sector, then first determine whether the corresponding secondary mapping table is valid. If it is valid, then use the MappingTable::GetPhysicalSectorAddr object to determine whether the sector is dirty or not, and if so, mark the sector as dirty. The GetPhysicalSectorAddr object will handle any required paging in mapping table 216. If mapping table 216 is not valid, then the logical sector number and sequence number may be added to the mapping table via the MappingTable::MapLogicalSector object. The MapLogicalSector object will return the previously mapped physical sector, if it exists, and this should be marked as dirty if that is the case. In the free sector case, then there is nothing to do because the free list was determined in the first pass.

In various embodiments, compactor module 214 is responsible for recycling dirty sectors into free sectors. Compactor module 214 analyzes an entire flash block to determine which sectors are dirty and can be recycled. Any sectors in a block that are not dirty are re-mapped to another portion of the media. Compactor module 214 handles reclaiming dirty sectors so that they can be used again. It contains an idle compaction thread that will reclaim dirty sectors when the system is idle. The compactor also handles cleaning up partial writes so that the flash is back in a consistent state. It exports the following major functions: (1) CompactBlocks; and (2) ResumeCompaction.

Compactor module 214 may use a compaction control sector. The compaction control sector (data portion) may have the following format:

Signature (DWORD)—this will be the identifier for the type of control sector.

Number of control sectors (DWORD)—Since the physical sector run list can potentially take multiple sectors, a recover control can take up a series of sectors. These sectors must be physically contiguous. Each sector in the series will have the same format.

Next free physical control block (DWORD)—this will be the next physical block that will be allocated as a control block. This is needed to handle a partial write of a control sector (described later)

Checksum for last sector (DWORD)—this will be a checksum for the last sector of the copy. This is used to determine if the compaction fully completed successfully.

Checksum for control sector (DWORD)—there will be a checksum for the control sector data itself to determine if there was a partial write of the control sector.

Sequence number for control sector (LARGE_INTEGER)—the sequence number for the control sector will be 64 bits, which is assumed to be large enough such that rollover does not need to be handled.

Erase blocks list count (DWORD)—this is the number of bytes in the erase blocks list Source physical sector list count (DWORD)—this is the number of bytes in the source physical sector list, which contain the source location of the sectors to copy as part of the compaction Destination physical sector list count (DWORD)—this is the number of bytes in the destination physical sector list, which contain the destination location of the sectors to copy as part of the compaction Erase blocks runs (array of DWORD pairs)—this will be a list of runs, each run consisting of a start physical block and the number of physical blocks in the run. Each run represents a range of blocks to erase as part of the compaction.

Source physical sector runs list (array of DWORD pairs)—this will be a list of runs, each run consisting of a start physical sector and the number of physical sectors in the run. Each run needs to be copied to the destination location as part of the compaction process.

Destination physical sector runs list (array of DWORD pairs)—this will be a list of runs, each run consisting of a start physical sector and the number of physical sectors in the run. The list will make up the destination location as part of the compaction process.

Figure 5:
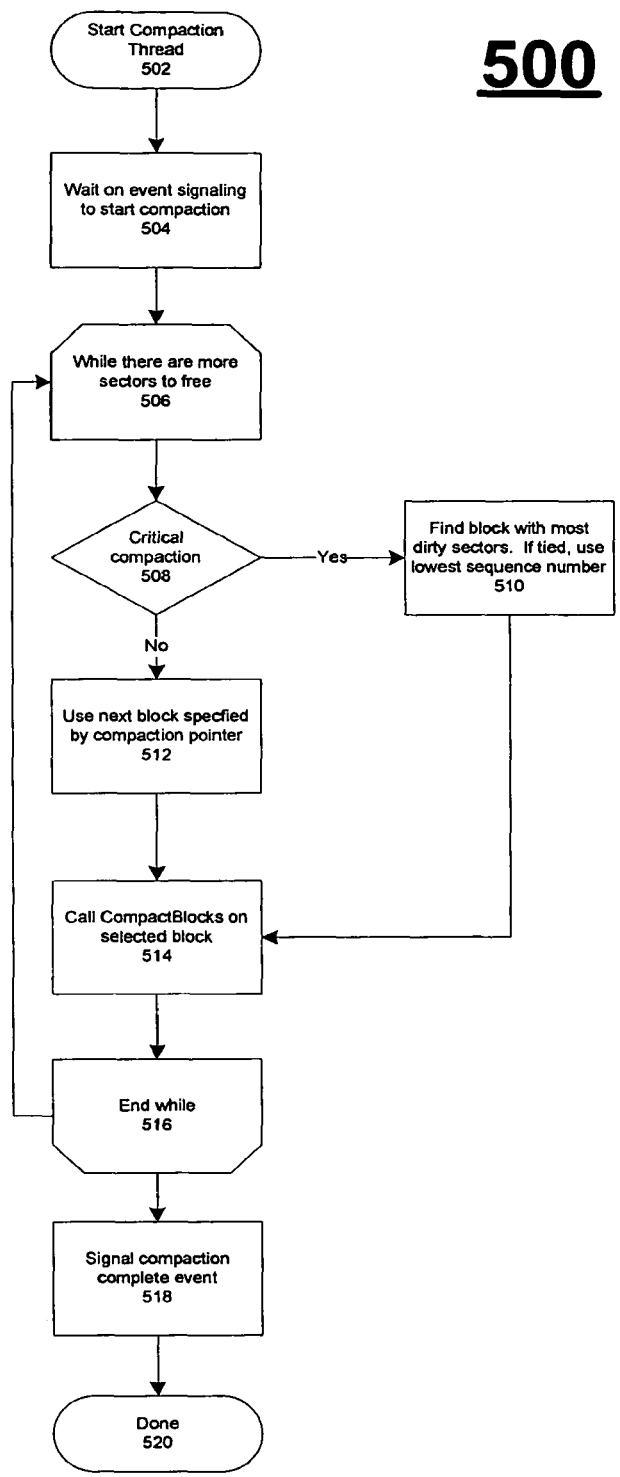
FIG. 5 illustrates an exemplary embodiment of a third logic flow.

FIG. 5 illustrates an exemplary embodiment of a logic flow 500. Logic flow 500 may be representative of a compactor thread for compaction module 214. In various embodiments, compactor module 214 may use a compactor thread for performing idle and critical compaction operations. For example, sector manager 212 determines when the idle threshold and the critical threshold have been reached and calls an object Compactor::StartCompactor with the appropriate priority of the thread as indicated at block 502. Sector manager 212 also passes in the number of free sectors that need to be reclaimed before compacting operations are finished. Once initiated, the Compactor::StartCompactor object may wait for event signaling to begin compaction operations at block 504.

While there are more sectors to free at block 506, a determination may be made as to whether the compaction operations should be idle compaction operations or critical compaction operations at diamond 508. If idle compaction operations are determined at diamond 508, then idle compaction operations may be performed for a block having the highest number of dirty sectors at block 510. If there is a tie between blocks, then the block with the lowest sequence number may be compacted first at block 510. This helps to reduce the chance of a sequence number wrap-around scenario.

An idle compaction occurs when it is "convenient" to start recycling dirty sectors into free sectors. During an idle compaction, compactor module 214 runs as a low-priority thread in the system and only consumes central processing unit (CPU) cycles when all other higher-priority threads in the system are blocked. After the idle compaction completes, compactor module 214 "blocks" and relinquishes control of the CPU. Determining when to schedule an idle compaction may be accomplished by comparing dirty sectors with free sectors. Whenever the number of dirty sectors exceeds the number of free sectors, it is time to cleanup and perform compacting operations for flash memory 114. Idle compactions work well when the system is idle and allows compactor module 214 to recycle dirty sectors into free sectors.

If sector manager 212 starts running out of free sectors before compactor module 214 can execute, however, a critical compaction must be scheduled. During a critical compaction, compactor module 214 runs as the highest-priority thread in the system and is allowed to execute immediately. If critical compaction is determined at diamond 508, then a next block may be selected for compaction as specified by a compaction pointer at block 512.

Once a block has been selected for compaction, an object such as CompactBlocks may be called to perform compaction operations for the selected block at block 514. Operations for the CompactBlocks object may be further described with reference to FIG. 6. Once the number of free sectors needed to fulfill the write request is reclaimed as determined at block 516, compactor module 214 will finish. A compaction complete event signal may be sent at block 518, and the routine may exit at block 520.

Figure 6:
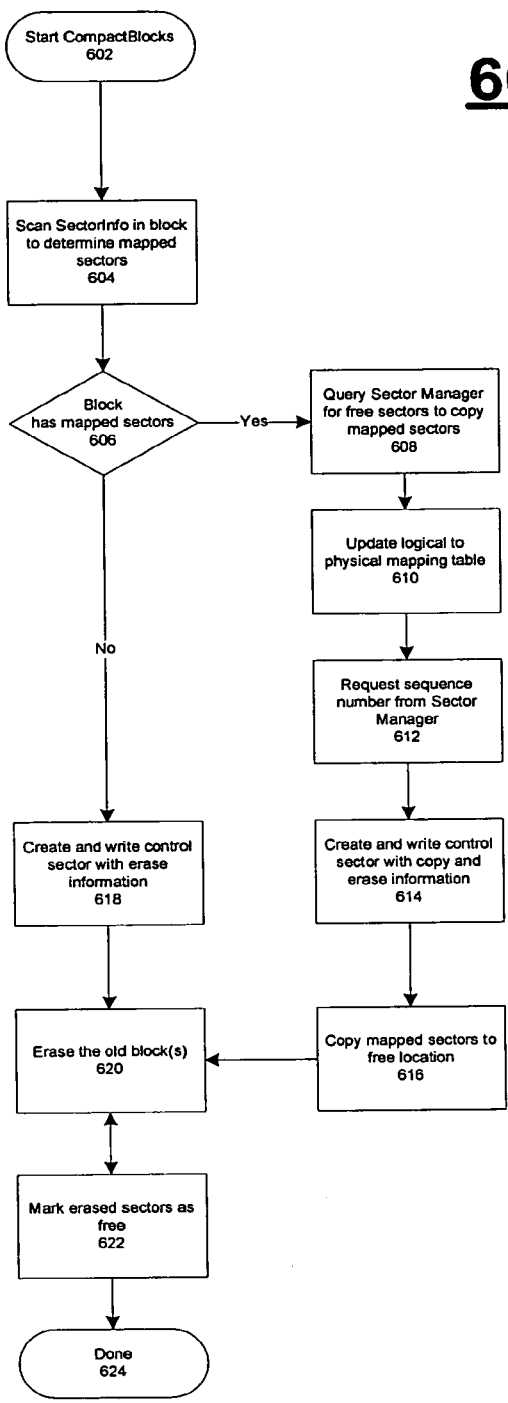
FIG. 6 illustrates an exemplary embodiment of a fourth logic flow.

FIG. 6 illustrates an exemplary embodiment of a logic flow 600. Logic flow 600 may be representative of operations for a CompactBlocks object executed by compaction module 214 as indicated by block 602. The CompactBlocks object is responsible for compacting one or more blocks. This will typically be done as part of critical or idle compaction, where there will be only one block compacted at a time. This can also be done in order to clean up any intermediate writes that may have been done before a power-failure, where there can be multiple blocks compacted.

As shown in FIG. 6, the CompactBlocks object may begin execution by scanning for SectorInfo in a block to determine mapped sectors at block 604. The CompactBlocks object reads SectorInfo for each sector in the block. A determination may be made at diamond 606 regarding whether a block has any mapped sectors. This may be accomplished by looking up the logical-to-physical sector mapping for each sector. If they match, and therefore are currently mapped, then this sector is mapped and needs to be copied as part of the compaction process. The mapping table lookup can potentially cause a page out of the mapping table, which is handled by the mapping table object.

If the block has any mapped sectors as determined at diamond 606, then sector manager 212 may be queried for a free block to copy mapped sectors at block 608. If there are any mapped sectors in the block to be compacted, then these sectors will need to be moved to a new block before the erase. Sector manager 212 may be queried with an object such as SectorMgr::GetFreeDataSectors. If this is being done in order to delete a partial write transaction, then the destination location needs to start on a new block, so pass this option as a flag to the object GetFreeDataSectors. It is worthy to note that even if the partial write spans multiple blocks, only one block will need to be copied to a new location because the write sectors are filled sequentially.

Once sector manager 212 returns one or more free blocks, logical-to-physical mapping table 216 may be updated with the new block information at block 610. Logic flow 600 may loop through each of the physical sectors returned and update logical-to-physical mapping table 216 with the object MappingTable::MapLogicalSector. This can potentially require a page out of one or more mapping tables to flash before the write can begin. The MapLogicalSector sector will return an existing physical sector if one exists. In this case, report that sector as dirty to sector manager 212 via the object SectorMgr::MarkSectorAsDirty.

Once mapping table 216 is updated, a sequence number may be requested from sector manager 212 at block 612. A control sector and data sector sequence number may be requested for this transaction. This can potentially cause a sequence number rollover, which is handled by the function.

Once sector manager 212 returns the sequence numbers, a new compaction control sector may be created having the highest sequence number at block 614. If a copy needs to be done, the control sector will have the source sector runs and the destination sector run that describes the copy operation, so that the copy can be resumed in case power is interrupted during the copy process. The control sector will also have the blocks that are to be erased, so that this also can be resumed in the case of a power failure. To write data to the compaction control sector, sector manager 212 may be queried with the object SectorMgr::GetFreeControlSectors to get the next free physical sectors for the control sectors. The compaction control sector may be written out through FMD 220. If a write failure occurs, the control sectors may be written to the next free block, and the current control block may be erased.

Once the compaction control sector has been created and written to flash memory 114, the mapped sectors may be copied from the source location to the destination location using FMD 220 at block 616. For example, the copying may be accomplished using a FMD_CopySectors API. If a write failure occurs, then this will be handled in the same way as a recover compaction, where new physical destination sectors will be allocated and the compaction blocks will repeat from the beginning. A new compaction control sector will be written with the new copy information and the erase list will include the original list as well as any new blocks that were just partially written to. There will be a limit on the number of times this is re-tried. The write failure itself will not determine if the block is marked bad. Only if the erase fails will the block be marked bad.

Once copying operations have been completed, all blocks that contain the sectors that need to be deleted may be erased at block 620. If any block erase fails, then the block may be marked as a bad block. The erased sectors may now be reported as free to sector manager 212 at block 622, and the routine exits at block 624.

Returning again to diamond 606, if the block does not have any mapped sectors then a compaction control sector may be created and written to with erase information at block 618. Erase and reporting operations of blocks 620, 622 may then be performed, and the routine exits at block 624.

Figure 7:
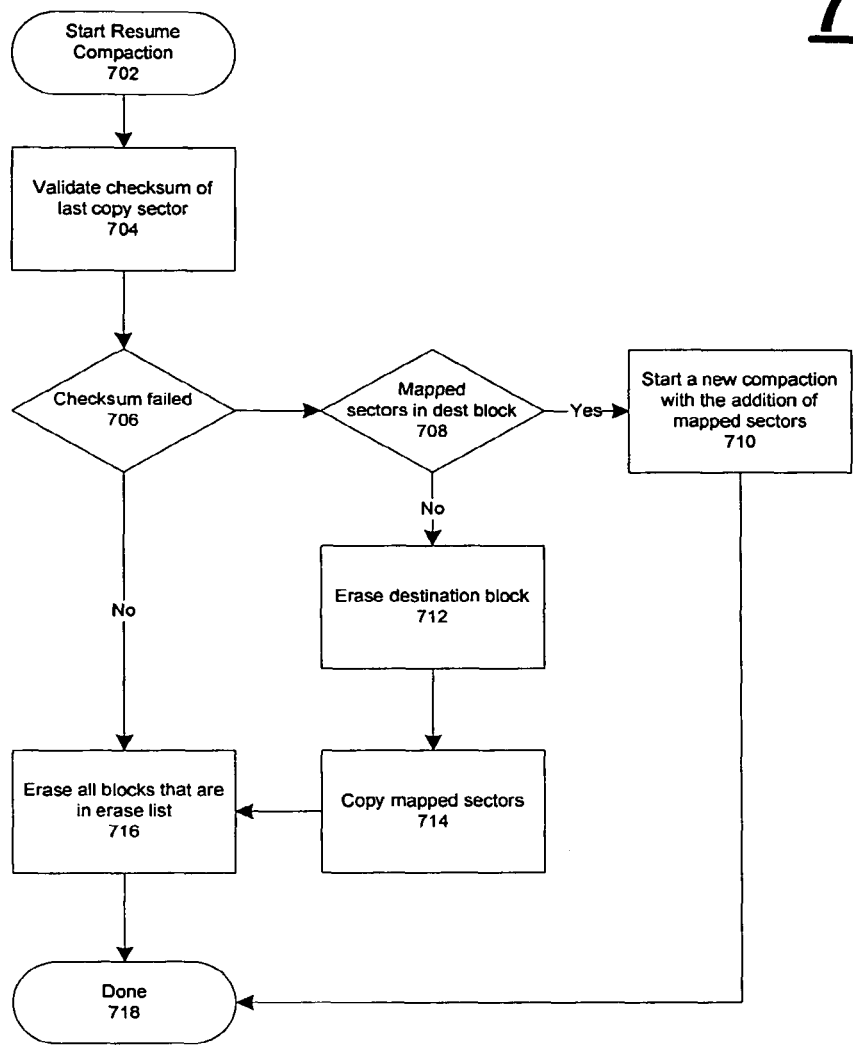
FIG. 7 illustrates an exemplary embodiment of a fifth logic flow.

FIG. 7 illustrates an exemplary embodiment of a logic flow 700. Logic flow 700 may illustrate operations for resuming compaction operations if interrupted prior to completion. If compaction operations are interrupted prior to completion, such as due to a power failure, then compaction operations need to be resumed in such as way that does not require creating additional control sectors. This reduces or avoids running out of free sectors because of repeated reboots during the resume process. The ResumeCompaction object is called by the BuildupMappingInfo object as indicated by block 702.

To resume compaction operations, the checksum of the last copy sector may be validated at block 704. If the checksum is valid as determined at diamond 706, then all blocks that are in the erase list may be erased at block 716, and the routine exits at block 718. If there were mapped sectors that needed to be copied and the last one has an invalid checksum as determined at diamond 706, however, then the copy needs to be resumed. There are two cases to handle: (1) when the destination copy starts in the middle of the block; and (2) when the destination copy starts at the beginning of the block.

If the block in which the sectors were copied to occurred starting in the middle of the block as determined at diamond 708, then the previous sectors can potentially be mapped and need to be copied before that block is erased at block 710. Since there is no way of knowing if sectors are dirty or not at this stage, all of the sectors are copied with their same sequence number as before. Since the logical-to-physical mapping has now changed for these sectors, a write sector will have to be written to invalidate the mapping table for these logical sectors. A new compaction process starts in the same way as a normal compaction. The copy lists contain the same sectors as the original compaction plus the new sectors in the destination block that need to be copied. The erase list contains the same blocks to erase as before plus all of the destination blocks in the original compaction.

If the block in which the sectors were copied to occurred starting at the beginning of the block as determined at diamond 708, then the compaction can be resumed without creating a new compaction control sector. In this case, all of the destination blocks can be erased at block 712 and the copy operations can resume as normal at block 714.

The blocks required to be erased are erased again unless a new compaction occurs. This is done regardless of if the erase actually completed or not because the completion of the compaction is not logged. It is safe to do this since these blocks will not be used again until there is the start of a new transaction, which will be logged with a higher sequence number. The newly erased blocks need to be marked as free, if they were not already free.

Figure 8:
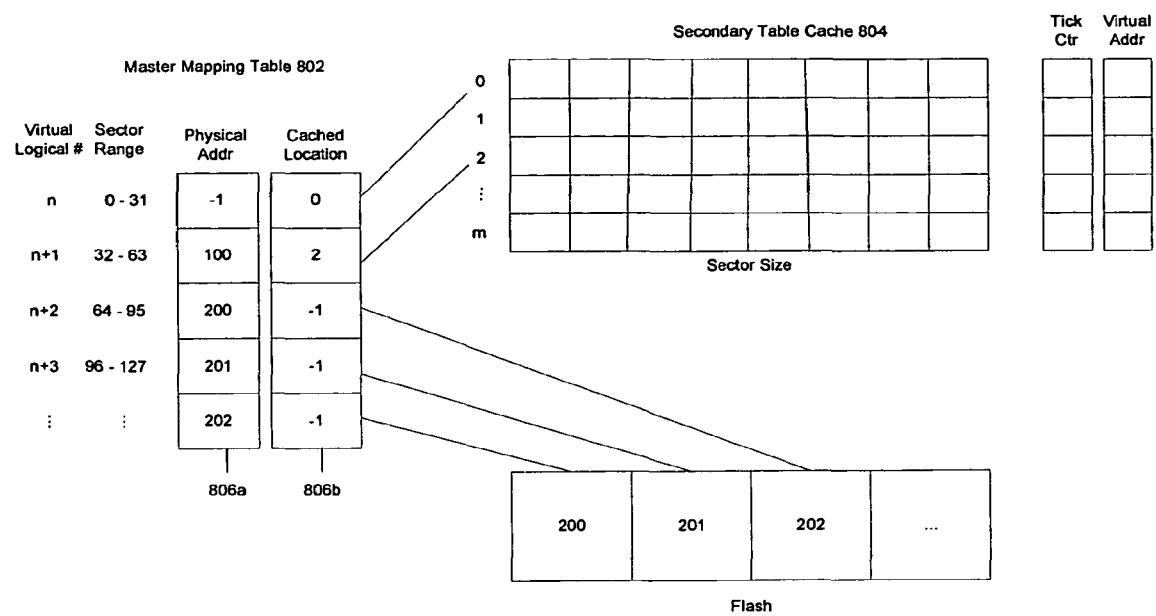
FIG. 8 illustrates an exemplary embodiment of a mapping table.

FIG. 8 illustrates an exemplary embodiment of a mapping table 216. The mapping table object is responsible for maintaining the logical-to-physical mapping for mapping table 216 and also to handle paging in and out of the secondary mapping tables. It implements the following public functions: (1) MapLogicalSector; and (2) GetPhysicalSectorAddr. The following functions are used during initialization: (1) Init; (2) Deserialize; (3) AddMasterTableEntry; and (4) CheckMasterTableEntry. A Serialize function may be used during a safe shutdown:

Mapping table 216 may use a data structure as shown in FIG. 8. Mapping table 216 may implement a two-level approach. A master mapping table 802 contains a table of pointers to one or more secondary tables. Master mapping table 802 is indexed based on a virtual logical sector number. The virtual logical sector numbering extends past the actual logical sector range in the region starting with n, where n is the number of logical sectors in the region. Each virtual logical sector number corresponds to a range of actual logical sectors and the mapping for these actual logical sectors is specified in secondary mapping table.

Master mapping table 802 may comprise two parallel arrays, one array 806a for the physical sector location of the secondary table in flash and another array 806b for the index in the secondary table cache. In addition, there may be a third parallel array that is used for storing the max sequence number, which will only be used during initialization and deallocated afterwards. Master mapping table 802 may have the following types of information:

Number of entries (DWORD)—This will be the number of entries in each array. This corresponds to the number of secondary tables.

Physical address array (array of DWORDs)—This will be an array specifying the location of each of the secondary mapping tables in flash. A value of −1 will indicate this table is dirty, meaning the physical copy on flash is no longer valid.

Cached location array (array of WORDs)—This will be an array specifying the index in the secondary table cache. A value of −1 will indicate not cached.

Sequence number array (array of DWORDs)—This will only be used during initialization when doing a manual scan. It specifies the max sequence number seen for a particular logical sector range and secondary table. It is used to determine whether a secondary table is valid or not.

Each secondary mapping table is the size of a single sector. The number of logical sectors that can be represented in a single secondary table is sector size/bytes per entry. The bytes per entry is determined by the minimum number of bytes necessary to represent the physical sector range. Once the entries per secondary table is determined, this determines the size of the master mapping table.

The secondary table will be an array of unsigned values. The size of each value will be anywhere from 1 to 4 bytes, depending on the logical sector address space. The size for the entire secondary mapping table is fixed to a sector size.

The secondary mapping tables can either be cached in RAM (e.g., system memory 106) or located on flash memory 114. One array is used to store the physical sector address of each secondary table in flash. Another array is used to store the index of the secondary table cache 804 in RAM.

Secondary table cache 804 will be used to store in-RAM copies of the secondary tables. The total size of the cache will be set in the registry. The second table cache 804 object may comprise the following:

Array of secondary mapping tables—This will be an array of sector-sized tables.

Tick counter array (array of DWORDs)—Each secondary mapping table will have an associated tick counter, which will be updated every time a secondary table is accessed. This will aid in the policy for paging out of the mapping table.

Virtual logical numbers array (array of DWORDs)—Each secondary mapping table will have a back reference to the master mapping table via a virtual logical number. This can used to quickly determine the physical location.

If a safe shutdown occurred, then the entire master mapping table can be deserialized from the byte stream into the mapping table object. The secondary tables will remain in flash and will be loaded into the secondary table cache on demand.

If a safe shutdown did not occur before, then the mapping table will need to be built up manually. The MappingTable object exposes two functions for the BuildupMappingInfo object to use, that are referred to as an AddMasterTableEntry object and a CheckMasterTableEntry object.

The AddMasterTableEntry object is used to add a secondary table location to master mapping table 802. When the BuildupMappingInfo object finds a mapping table sector, it will call AddMasterTableEntry with the virtual logical sector number, the physical sector location, and the sequence number. The sequence number will be compared with the existing one, if any, in order to determine if this is a later version. If it is a later version, the physical sector location of the secondary table will be recorded in the location table.

The CheckMasterTableEntry object will be called by BuildupMappingInfo to determine if any data sector invalidates a particular secondary mapping table. This occurs if the sequence number of the data sector is higher than that of the secondary master table. CheckMasterTableEntry will take the logical sector of the data sector and the sequence number. First, the associated index in the mapping table is determined based on the logical sector number. Then, the existing sequence number is compared with the sequence number of the data sector. If the data sector is higher, then any existing secondary table location will be invalidated and the sequence number of the data sector will be recorded to determine if future secondary tables are valid.

The MapLogicalSector object and the GetPhysicalSectorAddr object are the set and get functions for a sector mapping. Both functions can be used to get/set both a real logical sector address as well as a virtual logical sector address. This allows the compaction and write routines to not have to special case handling of mapping table sectors.

The MapLogicalSector object will take the logical sector address and the physical sector. The logical sector address may comprise a virtual logical sector address and/or a real logical sector address. The virtual logical sector address indicates that a secondary mapping table is being mapped to a new physical location. In this case, the physical address in the master table is updated. The real logical sector address may be used to determine if the associated secondary mapping table is paged in. If not, it will call PageInMappingTable. Once it is paged in, it will set the physical sector and return the existing physical sector back to the caller, if any. It will also mark the secondary table physical sector as dirty by invalidating the physical address in the master table and calling SectorMgr::MarkSectorsAsDirty. The tick counter for the secondary table is also updated.

The GetPhysicalSectorAddr object takes in a logical sector address and returns the physical sector address. The logical sector address may comprise a virtual logical sector address and/or a real logical sector address. The logical and real sector addresses may be used as described previously with the MapLogicalSector object.

The PageInMappingTable object will take the index in the master mapping table to page in. It will first search to see if there are any free spaces in the secondary table cache. This is indicated by a 0 value for the tick counter. If a free space is found, then the secondary table can be paged in by reading the physical sector indicated in the location table.

If secondary table cache 804 is full, then a table needs to be paged out before another one can be paged in. In this case, a least recently used (LRU) algorithm will be used to determine which secondary table to page out. The tick counter of each secondary table will be checked and the lowest one will be paged out using the function PageOutMappingTable. Once this is complete, the secondary table of interest is paged in and the metadata for the secondary table is updated.

The PageOutMappingTable object will take an index into the secondary table cache. It will first check to see if the secondary table is dirty, and if not it will return right away since nothing is required. If the sector is dirty, then it will write it out to flash using WriteToMedia and pass a virtual logical sector number as the sector number and the secondary table as the buffer. WriteToMedia will occur as normal and will handle calling MapLogicalSector to update master mapping table 802.

On a safe shutdown, the main FALM 210 will first call the object MappingTable::Serialize, which will page out each of the secondary tables by calling PageOutMappingTable. It will then return the master mapping physical address array back to FALM 210 as a byte stream. Then, FALM 210 will call MappingTable::Deinit, which will clean up all of the internal data structures.

Figure 9:
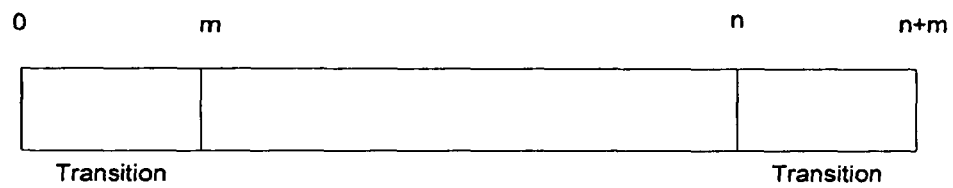
FIG. 9 illustrates an exemplary embodiment continuum of sequence numbers.

FIG. 9 illustrates an exemplary embodiment of a continuum of sequence numbers. FIG. 9 illustrates a number sequence 900 for a set of sequence numbers used to write control sectors and data to flash memory 114. The ranges 0-M and N−M+N are sequence numbers reserved for transitioning between count-up and count-down sequence number generation, where N and M are dictated by the size of a given flash part. A sequence number object will handle sequence number comparison and incrementing. It will implement the following functions: (1) Init; (2) Increment; (3) Reverse; and (4) Compare. The Init function will be provided with the size of the sequence number in bytes, whether counting is unidirectional or bidirectional, and an initial value. If the counting is bidirectional, then the Init function will also be provided with the current direction of counting. The Increment function will increase the current value by 1 if counting upwards or decrease the value by one if counting downwards. In addition, it will return a special LRESULT once the transition range has been reached. While in the transition range, it will continue counting in the same direction until reverse is explicitly called. The Reverse function will basically reverse the direction of counting and set the value at the appropriate starting point for the particular direction. The Compare function will return 1 for greater than, 0 for equals, and −1 for less than, although these will likely be wrapped around greater than and less than operator functions.

Sequence number counting can either be unidirectional or bidirectional. Unidirectional counting is used for control sectors, where the size of the sequence number (e.g., 64 bits) is sufficiently large such that rollover does not need to be handled. Bidirectional counting is used for data sectors, where the sequence number is smaller and therefore rollover needs to be taken into account. Unidirectional counting is trivial. Basically, the Compare function will just use a standard integer compare. Bidirectional counting, however, is much more complicated.

Number sequence 900 shows the counting range when doing bidirectional counting of the sequence numbers. As shown in FIG. 9, the largest value for a sequence number, n+m, is determined by the number of bits available to store the sequence number. The size of the sequence number is provided through the Init function. The sequence number counting starts with the value m and goes higher. Once it reaches n, then the counting switches downward. Once the counting changes direction, there can not be any sectors currently in the direction about to be entered, otherwise the Compare function would fail. The purpose of the transition sequence numbers is to have a buffer space built into the numbering when changing directions in counting. This allows the HandleSequenceNumberRollover function to have sequence number to use for preparing for a rollover.

In order to compare sequence numbers, the direction information needs to be embedded into the sequence number. The most significant bit will be used to designate direction, where a value of 1 indicates counting downward. When counting up, a larger value is considered as greater than with regards to the Compare function. When counting down however, a smaller value is considered as greater than with regards to the Compare function. And a sequence number with a different direction than the current direction will always be less than the current direction. Therefore, the sequence number object must be provided with the current direction, and this is provided in the Init function.

Unidirectional counting is trivial for this function. Standard integer operators will be used. With bidirectional counting, first the direction of the two numbers will be compared. If the directions are different, then the number with the same direction as the current state is greater. If the directions are the same, then the Compare function will return greater than for the number that is numerically greater when counting up and the number that is numerically less when counting down.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
performing a write transaction comprising:
writing a first control sector with a sequence number to a flash memory, wherein the control sector is not a data sector and wherein the sequence number is determined using bidirectional counting, wherein a most significant bit of the sequence number is used to designate a current direction of the bidirectional counting;
writing a checksum to the first control sector; and
writing the sequence number, an address for a logical sector, and data to at least one physical sector mapped to the logical sector;
determining whether the physical sector corresponding to the logical sector is dirty using the sequence number;
validating a checksum of a last write sector; and
compacting all blocks on the flash memory that contain the data written to the at least one physical sector, when the checksum of the last write sector fails, so that the write transaction is rolled back.

2. The method of claim 1, the compacting comprising:
determining that an idle threshold has been reached; and
determining a number of free sectors to be reclaimed from the failed write transaction.

3. The method of claim 2, comprising:
performing compaction for a block having at least one of: the highest number of dirty sectors and the lowest sequence number, when the idle threshold is reached, wherein compaction is complete when the number of free sectors to be reclaimed are reclaimed.

4. The method of claim 2, comprising:
determining that the idle threshold has been reached when a number of dirty sectors exceeds a number of free sectors.

5. The method of claim 1, the compacting comprising:
determining whether a block to be compacted has any mapped sectors;
indicating that a mapped sector needs to be copied when the block has mapped sectors;
requesting a new free block to copy mapped sectors to;
updating a logical-to-physical mapping table with the new free block information; and
requesting a sequence number for the new free block.

6. The method of claim 5, comprising:
creating a new compaction control sector having the requested sequence number, the new compaction control sector having a source sector run and a destination sector run that describes a copy operation and the blocks that are to be erased;
writing the compaction control sector to the new free block;
copying the mapped sectors from a source location to a destination location in the new free block; and
erasing all blocks containing sectors to be deleted when the copying is complete.

7. The method of claim 5, comprising:
resuming an interrupted compaction operation by:
determining that a checksum of a last copy sector is invalid; and
determining where a destination copy starts with respect to the block.

8. The method of claim 7, wherein the destination copy starts in the middle of the block, the method comprising:
copying all of the sectors with their same sequence number;
writing a write sector to invalidate the mapping table for the copied sectors; and
starting a new compaction operation including the sectors in the interrupted compaction and new sectors in the destination block that need to be copied, where the blocks to be erased comprise the same blocks to erase as in the interrupted compaction and all of the destination blocks in the interrupted compaction.

9. The method of claim 7, wherein the destination copy starts in the beginning of the block, the method comprising:
erasing all destination blocks from the interrupted compaction;
resuming copy operations from the interrupted compaction; and
erasing the blocks to be erased from the interrupted compaction again.

10. An apparatus, comprising:
a processor;
a flash memory coupled to the processor; and
a flash management module that when executed by the processor is arranged to:
perform a write transaction comprising:
write a first control sector with a sequence number to the flash memory, wherein the control sector is not a data sector and wherein the sequence number is determined using bidirectional counting, wherein a most significant bit of the sequence number is used to designate a current direction of the bidirectional counting;
write a checksum to the first control sector; and
write the sequence number, an address for a logical sector, and data to at least one physical sector mapped to the logical sector;
determine whether the physical sector corresponding to the logical sector is dirty using the sequence number;
validate a checksum of a last write sector; and
compact all blocks on the flash memory that contain the data written to the at least one physical sector, when the checksum of the last write sector fails, so that the write transaction is rolled back.

11. The apparatus of claim 10, the flash management module having a compactor module to recycle dirty sectors into free sectors, the compactor module arranged to:
determine that an idle threshold has been reached; and
determine a number of free sectors to be reclaimed from the failed write transaction.

12. The apparatus of claim 11, the compactor module arranged to:
perform compaction for a block having at least one of: the highest number of dirty sectors and the lowest sequence number, when the idle threshold is reached, wherein compaction is complete when the number of free sectors to be reclaimed are reclaimed.

13. The apparatus of claim 11, the compactor module arranged to:
determine that the idle threshold has been reached when a number of dirty sectors exceeds a number of free sectors.

14. The apparatus of claim 10, the compactor module arranged to:
- determine whether a block to be compacted has any mapped sectors;
- indicate that a mapped sector needs to be copied when the block has mapped sectors;
- request a new free block to copy mapped sectors to;
- update a logical-to-physical mapping table with the new free block information; and
- request a sequence number for the new free block.

15. The apparatus of claim 14, the compactor module arranged to:
- create a new compaction control sector having the requested sequence number, the new compaction control sector having a source sector run and a destination sector run that describes a copy operation and the blocks that are to be erased;
- write the compaction control sector to the new free block;
- copy the mapped sectors from a source location to a destination location in the new free block; and
- erase all blocks containing sectors to be deleted when the copying is complete.

16. The apparatus of claim 14, the compactor module arranged to:
- resume an interrupted compaction operation by:
- determine that a checksum of a last copy sector is invalid; and
- determine where a destination copy starts with respect to the block.

17. The apparatus of claim 16, wherein the destination copy starts in the middle of the block, the compactor module arranged to:
- copying all of the sectors with their same sequence number;
- write a write sector to invalidate the mapping table for the copied sectors; and
- start a new compaction operation including the sectors in the interrupted compaction and new sectors in the destination block that need to be copied, where the blocks to be erased comprise the same blocks to erase as in the interrupted compaction and all of the destination blocks in the interrupted compaction.

18. The apparatus of claim 16, wherein the destination copy starts in the beginning of the block, the compactor module arranged to:
- erase all destination blocks from the interrupted compaction;
- resume copy operations from the interrupted compaction; and
- erasing the blocks to be erased from the interrupted compaction again.

* * * * *